No. 888,116. PATENTED MAY 19, 1908.
F. R. OWENS.
RUNNING GEAR FOR VEHICLES.
APPLICATION FILED JAN. 18, 1907.
2 SHEETS—SHEET 1.
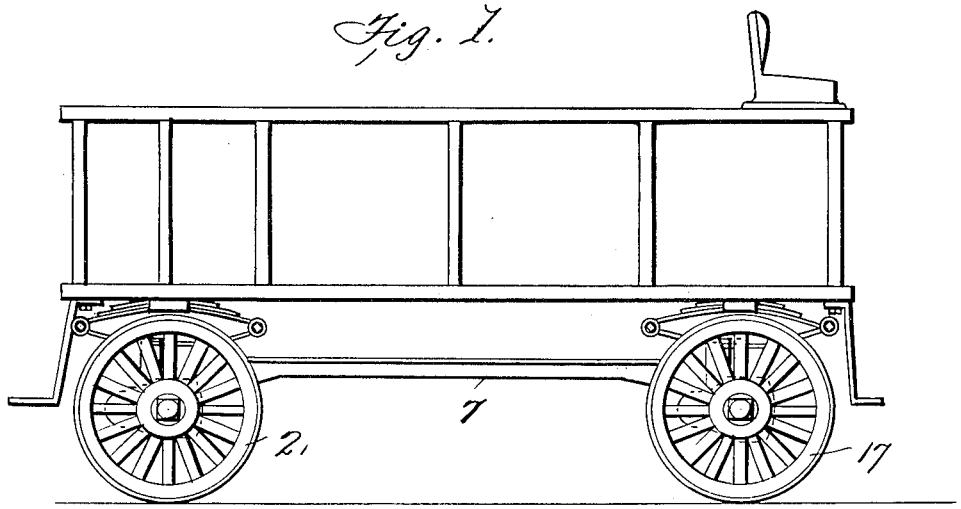
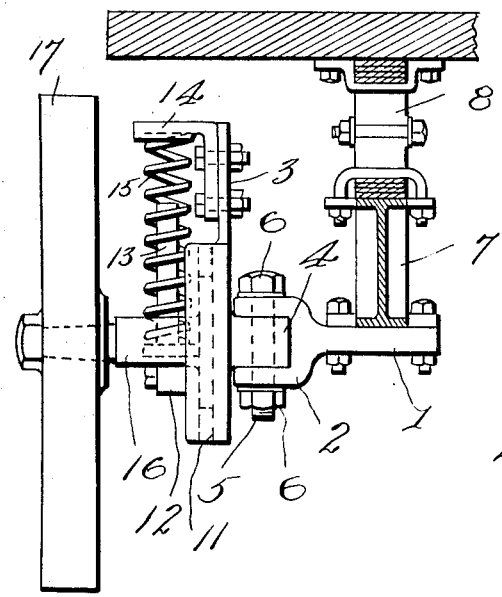
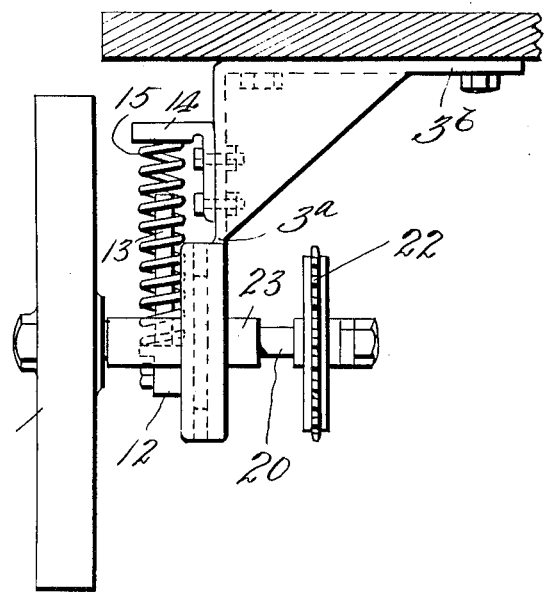
Inventor
Frank R Owens
Witnesses
Chas N. Davies
N. E. Costello
By Bartlett & Brock
Attorneys No. 888,116. PATENTED MAY 19, 1908.
F. R. OWENS.
RUNNING GEAR FOR VEHICLES.
APPLICATION FILED JAN. 18, 1907.
2 SHEETS—SHEET 2.
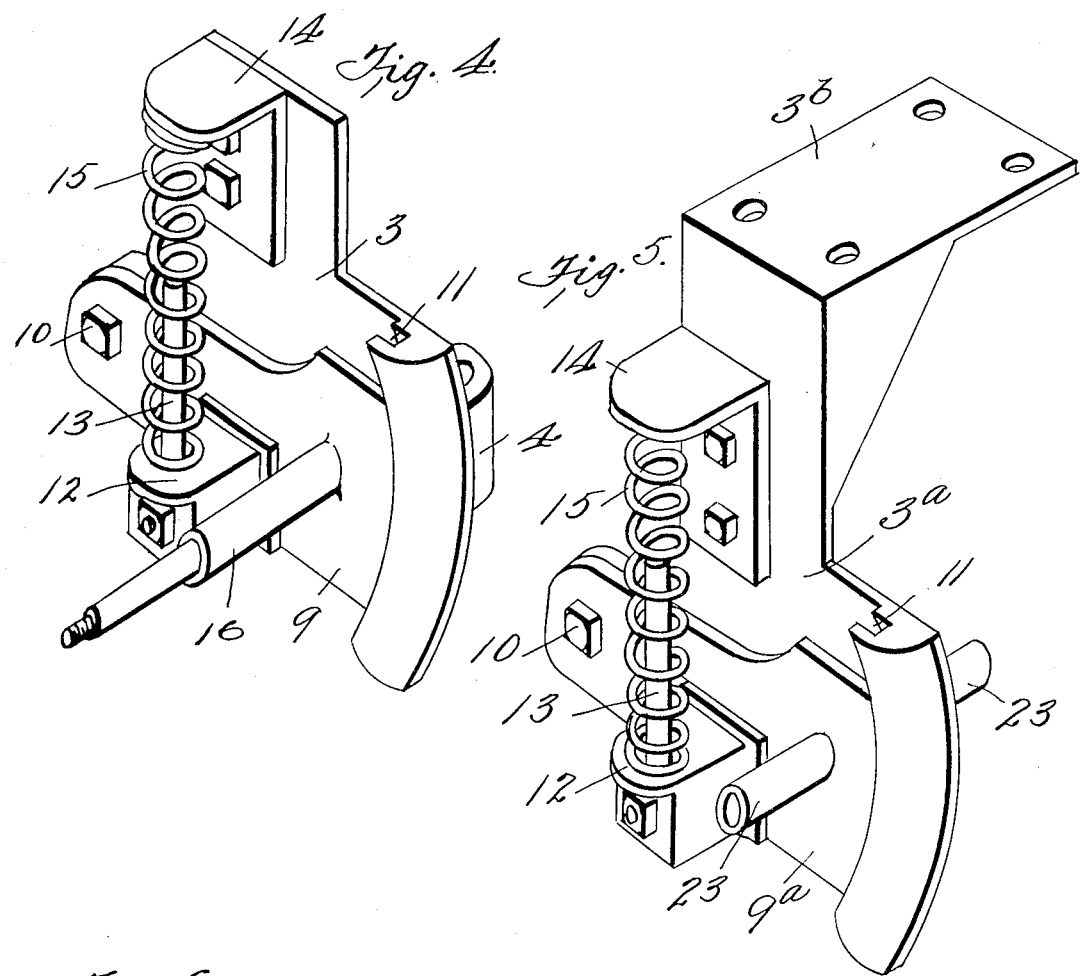
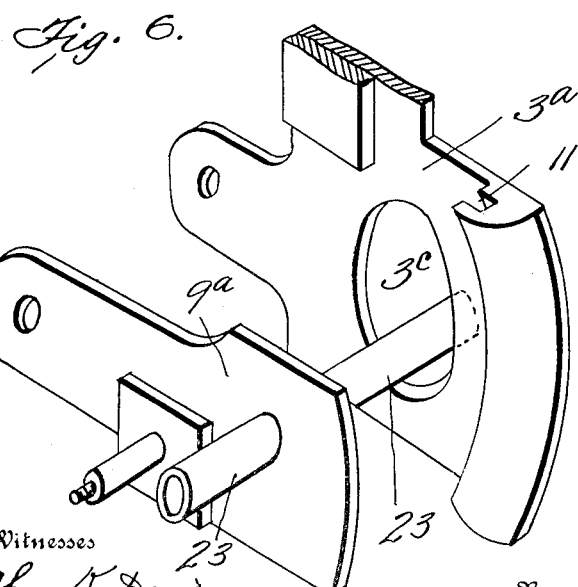

UNITED STATES PATENT OFFICE.

FRANK R. OWENS, OF BUREAU, ILLINOIS.

RUNNING-GEAR FOR VEHICLES.

No. 888,116.        Specification of Letters Patent.        Patented May 19, 1908.

Application filed January 18, 1907. Serial No. 352,933.

*To all whom it may concern:*

Be it known that I, FRANK R. OWENS, a citizen of the United States, residing at Bureau, in the county of Bureau and State of Illinois, have invented certain new and useful Improvements in Running-Gear for Vehicles, of which the following is a specification.

My invention relates to vehicle running gear and is in general arrangement in some respects similar to the mechanism of my prior pending application, Serial No. 283,644 filed October 20, 1905.

The characteristics and advantages of my invention are hereafter fully set forth in connection with the accompanying drawing which illustrates exemplifying structures in which the invention is embodied and in which—

Figure 1 is a side elevation of a vehicle with my invention applied thereto; Fig. 2, a front view of the mechanism of one of the front wheels; Fig. 3, a similar view of the mechanism of one of the rear wheels; Fig. 4, a perspective view of the front wheel mounting; Fig. 5, a similar view of the rear wheel mounting; and Fig. 6, a partial perspective view of the rear wheel mounting with the parts shown disconnected.

My invention is conveniently employed in connection with vehicles having self-contained motive power, but all or a part of its features may be used in connection with other vehicles.

I will first describe the invention as applied to the front wheels.

Referring to the drawings (see Figs. 2 and 4), 1 is the axle which may extend across the front of the vehicle and serve for both front wheels, or may, as shown, be in two parts, one for each wheel; 2, a yoke or steering knuckle formed thereon; 3, a spring plate mounted pivotally in the steering knuckle 2 by means of a lug 4, bolt 5, and nuts 6; 7, a longitudinal frame member connecting the front and rear axles; 8, a double elliptical spring connected to frame member 7 and the wagon body; 9, a wheel plate mounted pivotally at 10 on swinging plate 3; 11, a guide slot formed in plate 3 in the form of the arc of a circle struck on point 10 as a center in which the forward end of plate 9, which is also formed in the shape of a circular arc, moves; 12, a spring lug carried by plate 9; 13, a pin on the lug; 14, a spring lug carried by plate 3; 15, a helical compressible spring of which the ends are engaged by lugs 12 and 14 and through the lower part of which pin 13 extends, serving as a guide or support for the spring; 16, the spindle integral with or connected to plate 9 and carrying one of the front wheels 17.

It is to be understood that there are two mechanisms such as shown in Fig. 2, one as shown for the right front wheel and the other for the left. A steering arm of the usual type used in motor vehicles is to be connected to each of lugs 4, or there is to be any other suitable means of swinging the front wheels around on the bolts 5 as a pivot to effect steering of the vehicle. As the vehicle encounters obstructions or variations in the road surface the wheels rise carrying with them the spindle 16 and plates 9 to which they are connected, the plates turning on points 10 as pivots and being guided at all times in their movement by slots 11, compressing the helical springs 15 which serve to cushion the movement of plates 9 and to return the wheels to their normal position in relation to the wagon body. Additional flexibility is afforded by the elliptical springs 8, the respective strength of springs 8 and 15 being regulated so as to give the best effect in operation. The mounting of the rear wheels is somewhat similar to that of the front except for the differences which will be explained:

$3^a$ is a plate for the right rear wheel provided with a horizontal bracket $3^b$ which may be secured to the wagon body or to a double elliptical spring similar to 8 interposed between it and the body; 20 is a rear axle which may extend across the vehicle and serve for both rear wheels or which may be in two parts, as shown in Fig. 3, one for each wheel; when the axle is divided one of the rear wheels 21 is connected to its outer end and the sprocket 22 to the other end so that the wheel may be driven through a chain from any suitable motor, and the axle is revolubly mounted in the sleeve 23 integral with the corresponding rear swinging plate $9^a$.

If the rear axle is continuous for both wheels, the wheels are to be mounted on individual sleeves which are revoluble upon axles, and sprockets 22 are to be carried by the sleeves so as to enable the wheels to be driven at different speeds by means of differential gearing mounted on some other shaft (not shown). Other parts of the rear wheel mounting are similar to the parts already described in connection with the front wheel except that plate 3ª is provided with an aperture 3ᶜ to accommodate the movement of the rear axle or sleeve 23.

The method of spring suspension for wheels which I have described possesses certain advantages which will appear to those versed in the art. Among these it may be pointed out that the vertical movement of the wheels, to accommodate variations in load and road surface, is effectively controlled by springs placed operatively between the wheels and a fixed point. The wheels are rigidly supported in regard to horizontal shocks by their mounting on plates 9, 9ª, which are positively connected to stationary members 3 at pivot points 10 which move at their forward ends in the guide slots 11. Any lateral forces exerted on the wheels are also effectually taken care of by this method of mounting.

It is to be understood that the exemplifying structures shown are only representative of my invention and that many variations may be made in matters of detail without departing from the spirit thereof.

I claim:

1. The combination of a guide plate having an arc-shaped groove, a wheel carrier pivoted thereon and having an arc-shaped edge resting in the groove, a bracket on the plate, a bracket on the carrier, a spring compressed between the brackets, and a wheel spindle on the carrier.

2. The combination of a guide-plate having an arc-shaped groove, a second plate pivoted thereon and having an arc-shaped edge resting in the groove, two brackets, one on each plate, one being rigid and the other pivotally mounted, a helical spring compressed between the brackets and a wheel spindle on the carrier.

3. The combination of a guide plate having an aperture and a guide, a second plate pivoted to the guide plate, a spring intermediate the plates, a bearing sleeve carried by the second plate and passing through the aperture in the guide plate, a short axle in the sleeve, a wheel on one end of the axle and a driving sprocket on the other end of the axle.

In testimony whereof I have hereunto affixed my signature in the presence of two witnesses.

FRANK R. OWENS.

Witnesses:
 SCOTT CRAIN,
 B. L. DILTS.